Patented Feb. 24, 1925.

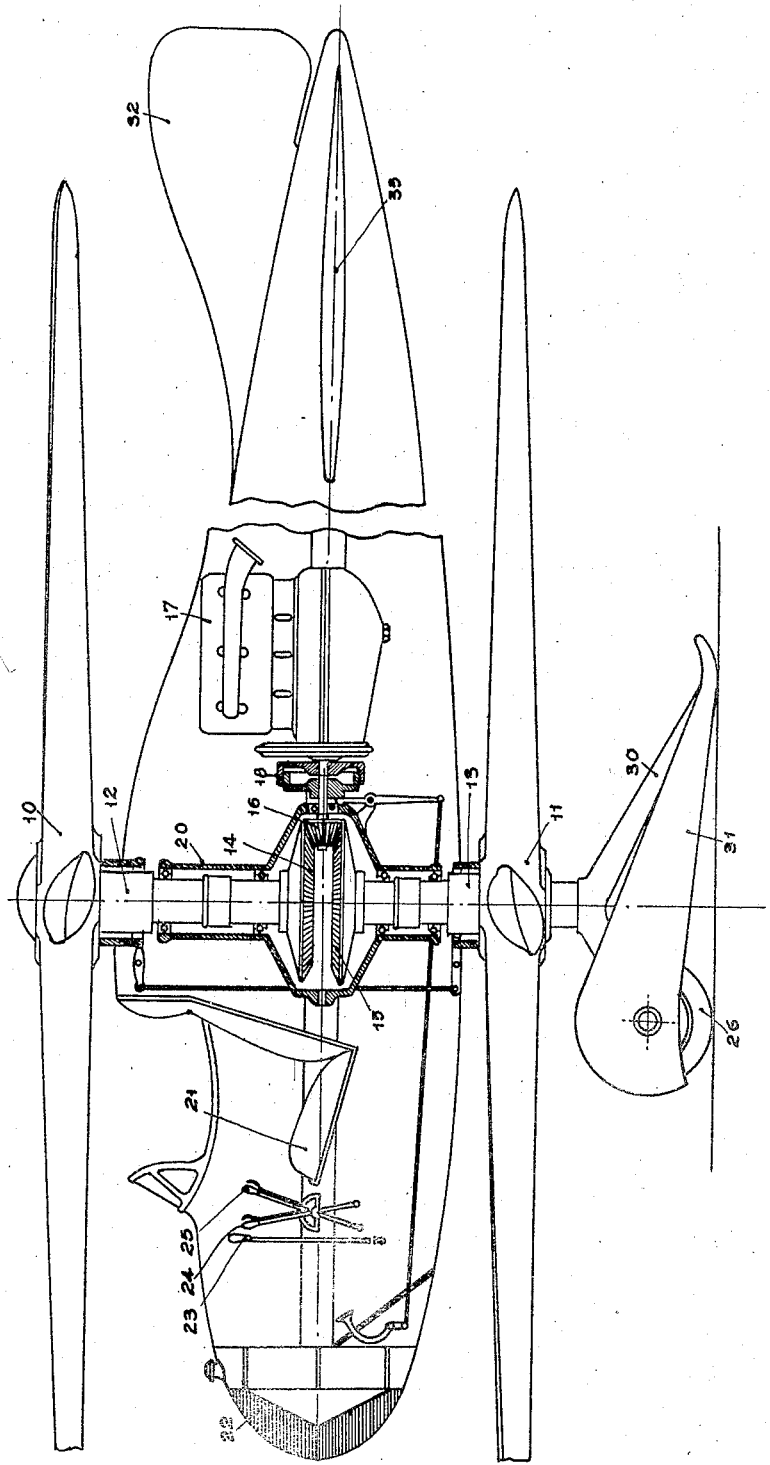

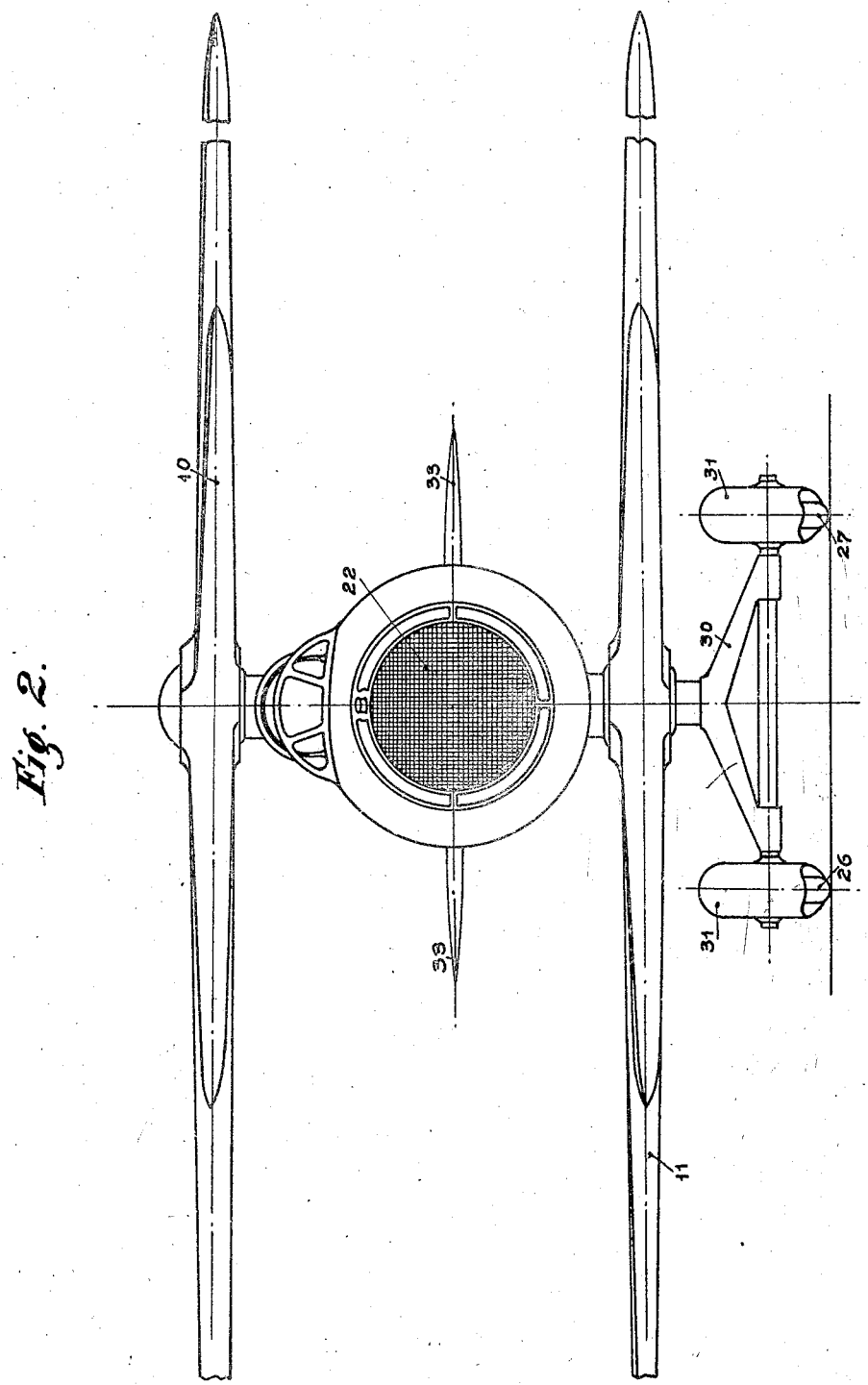

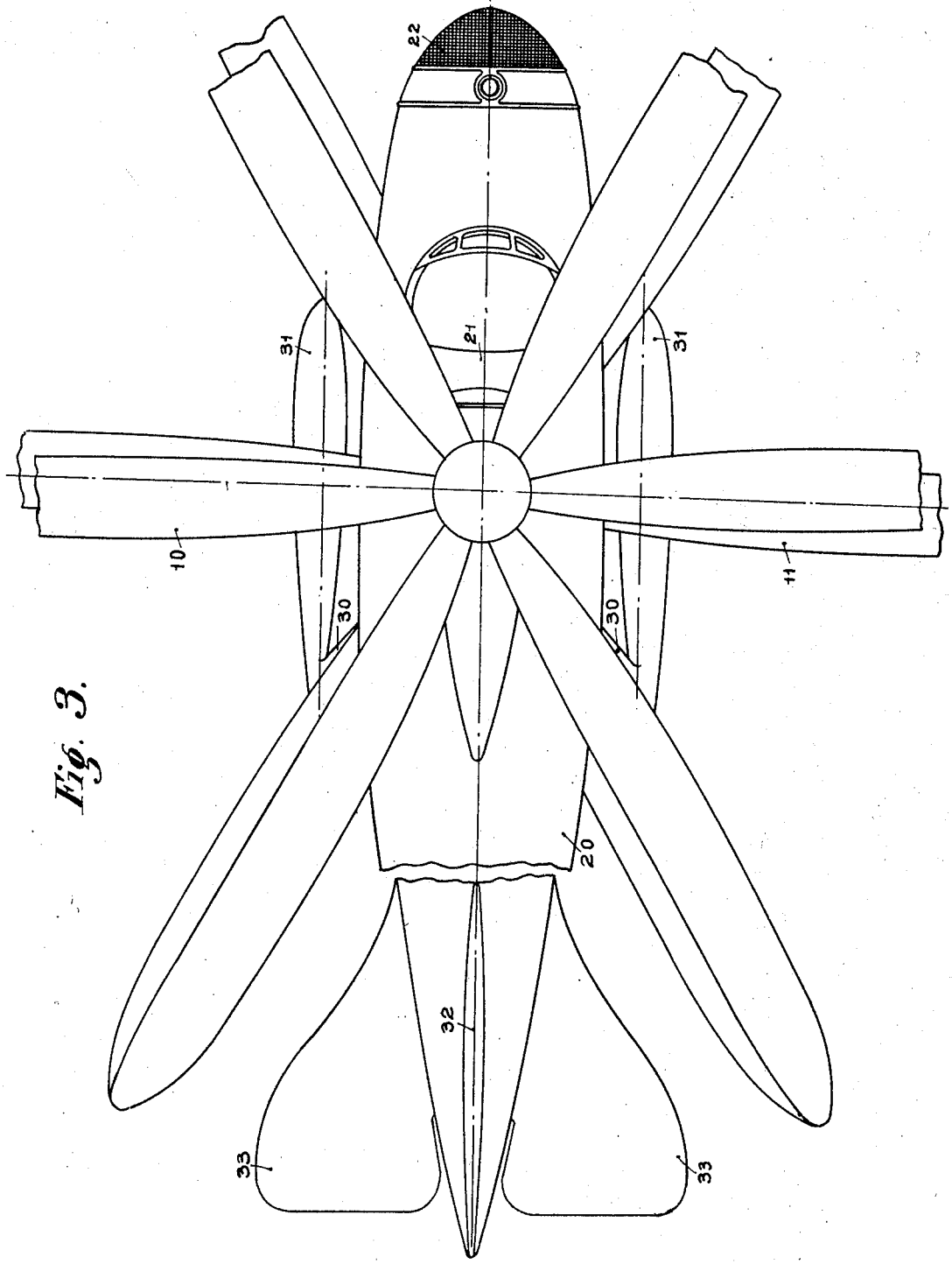

1,527,701

UNITED STATES PATENT OFFICE.

RAUL PATERAS PESCARA, OF BARCELONA, SPAIN.

HELICOPTER.

Application filed April 4, 1922. Serial No. 549,377.

*To all whom it may concern:*

Be it known that I, RAUL PATERAS PESCARA, citizen of the Argentina, and residing in No. 20 Calle Buenasuerte, Barcelona, Spain, have invented a new form of Helicopter, of which the following is a specification.

This invention relates to improvements in helicopters, and particularly to the type having a pair of oppositely rotating propellers.

This invention provides for the construction of a helicopter having a pair of oppositely rotating propellers and a body structure, in which the propellers are mounted above and below the body on a common axis. By this arrangement, the drive mechanism for the propellers and the control system for warping the blades are materially simplified over types where both propellers are above the body, and the moment of inertia is also considerably reduced.

The invention further provides for a special construction of housing carried by the frame for rotatively mounting both propellers with their axes aligned, and a landing gear suspended below the lower propeller and held against rotation through the center of the lower propeller shaft.

In the drawings:

Fig. 1 is a vertical sectional view through the invention.

Fig. 2 is a front elevation of the invention.

Fig. 3 is a plan view thereof.

A body 20 is mounted on a frame 19, which carries the housing 20' for rotatably mounting the shafts 12 and 13 of the upper and lower propellers 10 and 11 respectively. Thrust bearings mount the shafts in the housing and prevent relative axial movement of the shafts with respect to the housing. The body is provided at 21 with the pilot's and passengers' seat, the control levers 23, 24, and 25 being mounted in a convenient location forward of the pilot and the radiator 22 being mounted at the extreme front end. A motor 17 is mounted in the frame 19 to the rear of housing 20', and is connected through a clutch 18 to the driving pinion 16 meshing with and located between the crown gears 14 and 15 mounted on the shafts 12 and 13 respectively and forming a differential drive for the propellers.

The body is fitted with a rudder 32 and elevators 33 in the usual manner.

A landing gear may be provided below the lower propeller as shown in the drawings, including a frame 30 carried by the end of the shaft 13 through a suitable bearing connection, so that the frame may be held stationary with respect to the body through instrumentalities extending between the gears 14 and 15, and through the shaft 13 of the propeller which is hollow for the purpose and connected with frame 30. Members 31 are carried by the frame 30 and form guards for the wheels 26, and skids, and reduce the air resistance of the wheels in flight.

What is claimed is:

1. A helicopter including a frame, a body carried by the frame, a housing mounted within the body and secured to the frame, propeller shafts rotatably mounted in the housing and extending above and below the body, a propeller blade mounted on each shaft beyond the body, and a landing gear carried by one of the shafts below the body and beyond the adjacent propeller blade.

2. A helicopter including a frame, a body carried by the frame, a housing mounted within the body, and secured to the frame, propeller shafts rotatably mounted in the housing and extending above and below the body, an air propeller mounted on each shaft immediately adjacent and directly above and directly below the body, an annular gear carried by each shaft within the housing, a motor carried by the frame in the rear portion of the body, a driving connection between said motor and annular gears, and a landing gear arranged immediately below the lower air propeller and supporting the parts in line with said shafts.

In testimony that he claims the foregoing as his invention, he has signed his name.

RAUL PATERAS PESCARA.